United States Patent
Takahashi

(10) Patent No.: US 8,609,743 B2
(45) Date of Patent: Dec. 17, 2013

(54) METHOD FOR PRODUCING ELECTROLYTE MEMBRANE FOR FUEL CELL AND METHOD FOR PRODUCING ELECTROLYTE MEMBRANE-ELECTRODE ASSEMBLY FOR FUEL CELL

(75) Inventor: Mitsuhito Takahashi, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 840 days.

(21) Appl. No.: 12/527,196

(22) PCT Filed: Feb. 4, 2008

(86) PCT No.: PCT/JP2008/051747
§ 371 (c)(1),
(2), (4) Date: Aug. 14, 2009

(87) PCT Pub. No.: WO2008/099698
PCT Pub. Date: Aug. 21, 2008

(65) Prior Publication Data
US 2010/0024951 A1   Feb. 4, 2010

(30) Foreign Application Priority Data
Feb. 16, 2007 (JP) .................... 2007-036023

(51) Int. Cl.
*C08F 2/50* (2006.01)
(52) U.S. Cl.
USPC ........... 522/163; 522/162; 522/134; 522/135; 522/142; 522/143; 522/146; 429/523; 429/524; 429/525; 429/526; 429/527; 429/530

(58) Field of Classification Search
USPC ............ 522/162, 134, 135, 142, 143, 146; 429/523, 524, 525, 526, 527, 530
See application file for complete search history.

(56) References Cited

U.S. PATENT DOCUMENTS

| | | | |
|---|---|---|---|
| 7,714,027 B2 * | 5/2010 | Chen et al. ................. | 521/27 |
| 8,283,088 B2 * | 10/2012 | Yoshida et al. ............... | 429/493 |
| 2002/0127474 A1 | 9/2002 | Fleischer et al. | |
| 2003/0175569 A1 * | 9/2003 | Inagaki et al. .................. | 429/30 |

FOREIGN PATENT DOCUMENTS

| | | |
|---|---|---|
| EP | 1 742 286 A1 | 1/2007 |
| JP | 2000 306605 | 11/2000 |
| JP | 2002 313364 | 10/2002 |
| JP | 2003 82129 | 3/2003 |
| JP | 2004 526278 | 8/2004 |
| JP | 2005 78871 | 3/2005 |
| JP | 2006 291161 | 10/2006 |
| WO | 2006 123529 | 11/2006 |

OTHER PUBLICATIONS

Kyomoto et al. Self-Initiated Surface Graft Polymerization of 2-Methacryloyloxyethyl phosphorylcholine on Poly(ether ether ketone) by Photoirradiation. Applied Materials & Interfaces. vol. 1. No. 3. 537-542 (Feb. 16, 2009).*
Changquan Qiu, Fan Xu, Quang Trong Nguyen, Zhenghua Ping, Nanofiltration membrane prepared from cardo polyetherketone ultrafiltration membrane by UV-induced grafting method, Journal of Membrane Science, vol. 255, Issues 1-2, Jun. 15, 2005, pp. 107-115. retrieved from URL<(http://www.sciencedirect.com/science/article/pi)>.*
K. Scott, et al., "Performance of the direct methanol fuel cell with radiation-grafted polymer membranes", Journal of Membrane Science, vol. 171, No. 1, XP-004194077, Jun. 1, 2000, pp. 119-130.
"Advances in proton exchange membrane materials for fuel cells", Database CA [Online] Chemical Abstracts, AN 2005:162571, XP-002575613, Feb. 27, 2005, 1 page.
Thomas Bahners, et al., Highly hydrophobic textile surfaces obtained by thin-layer deposition, Contact Angle, Wettability and Adhesion, vol. 4, XP-002575614, 2006, pp. 307-320.
Chen, J. et al., "Preparation of ETFE-Based Fuel Cell Membranes Using UV-Induced Photografting and Electron Beam-Induced Crosslinking Techniques", Journal of Membrane Science, vol. 283, pp. 373-379 (2006).
Chen, J. et al., "Preparation of Fuel Cell Membranes by Photografting in Vapor and Liquid Phases", Electrochemical and Solid-State Letters, vol. 9(5), pp. G184-G186 (2006).
Chen, J. et al., "Polytetrafluoroethylene-Based Proton-Conducting Membranes Prepared by Ultraviolet-Induced Photografting", Electrochemical and Solid-State Letters, vol. 9(11), pp. G326-G329 (2006).
Yoshida, M. et al., " Kobunshi Kizai no Tokusei o Ikashita Koseino Nenryo Denchimaku no Kaihatsu ni Mukete", Radiation and Industries, No. 114, pp. 15-21 (Jun. 1, 2007).

* cited by examiner

*Primary Examiner* — Sanza McClendon
(74) *Attorney, Agent, or Firm* — Oblon, Spivak, McClelland, Maier & Neustadt, L.L.P.

(57) ABSTRACT

Disclosed is a method for producing an electrolyte membrane for fuel cells, which is characterized in that a radically polymerizable monomer is graft-polymerized to a resin without using a photopolymerization initiator by bringing the radically polymerizable monomer into contact with the resin after irradiating the resin with ultraviolet light. The electrolyte membrane for fuel cells obtained by ultraviolet irradiation graft polymerization has both excellent oxidation resistance and excellent mechanical characteristics. By using such an electrolyte membrane, there can be obtained a fuel cell exhibiting extremely high performance.

16 Claims, No Drawings

METHOD FOR PRODUCING ELECTROLYTE MEMBRANE FOR FUEL CELL AND METHOD FOR PRODUCING ELECTROLYTE MEMBRANE-ELECTRODE ASSEMBLY FOR FUEL CELL

CROSS REFERENCE TO RELATED APPLICATION

This application is a 371 of PCT/JP08/051747, filed on Feb. 4, 2008 and claims priority to Japanese Patent Application No. 2007-036023, filed on Feb. 16, 2007.

TECHNICAL FIELD

This invention relates to methods for producing an electrolyte membrane and an electrolyte membrane-electrode assembly for use in polymer electrolyte fuel cells (PEFCs), both having improved resistance to hydrogen peroxide.

BACKGROUND ART

Fuel cells using solid polymer electrolyte membranes are expected to find a wide variety of commercial applications as a power source or simple auxiliary power source for electric vehicles because of a low operating temperature below 100° C. and a high energy density. Involved in these PEFCs are important elemental technologies relating to such elements as electrolyte membrane, platinum based catalyst, gas diffusion electrode, and electrolyte membrane-electrode assembly. Among these, the technology relating to electrolyte membrane and electrolyte membrane-electrode assembly is one of the most important technologies governing the fuel cell performance.

In PEFCs, a fuel diffusion electrode and an air diffusion electrode are joined to opposing surfaces of an electrolyte membrane, so that the electrolyte membrane and electrodes form a substantially integral structure. Then the electrolyte membrane functions as an electrolyte for conducting protons and also plays the role of a diaphragm for preventing direct intermixing between hydrogen or methanol as the fuel and air or oxygen as the oxidant even under pressure.

Such electrolyte membranes are required as the electrolyte to have a high rate of proton transfer, a high ion exchange capacity, and a consistent, high water retention to maintain a low electric resistivity. From the role of a diaphragm on the other hand, electrolyte membranes are required as the membrane to have a high mechanical strength, dimensional stability and chemical stability in long-term service, and to rid of excessive permeability to hydrogen gas or methanol as the fuel and oxygen gas as the oxidant.

At the present, perfluorosulfonic acid/fluorocarbon resin membranes developed by E.I. duPont and commercially available as Nafion® are generally used. Conventional fluorocarbon resin electrolyte membranes as typified by Nafion® suffer from the problem of increased cost due to a number of steps involved in the manufacture process which has to start from the synthesis of monomers, and this problem becomes a serious bar to commercial application.

Efforts have thus been made to develop low-cost electrolyte membranes as a substitute for Nafion® and analogues. With respect to radiation-induced graft polymerization, JP-A 2002-313364 and JP-A 2003-82129 propose a method for producing a solid polymer electrolyte membrane by irradiating a fluorocarbon resin membrane with radiation to create radically active sites in the fluorocarbon resin, and grafting a reactive hydrocarbon monomer thereto, followed by sulfonation.

The membrane obtained from graft polymerization of a reactive hydrocarbon monomer by a radiation-induced graft polymerization process has a high degree of grafting and hence, a high proton conductivity, but suffers from lack of oxidation resistance.

While the radiation used in the conventional radiation-induced graft polymerization process is electron beam or gamma-ray, no reports about ultraviolet-induced graft polymerization have been found. It is believed that UV irradiation fails to induce graft polymerization to fluorocarbon resins having C—F bonds.

DISCLOSURE OF THE INVENTION

Problem to be Solved by the Invention

An object of the invention which has been made under the above-discussed circumstances is to provide methods for producing an electrolyte membrane and an electrolyte membrane-electrode assembly for use in fuel cells, both having oxidation resistance and improved mechanical properties.

Means for Solving the Problem

Making extensive investigations to attain the above object, the inventor has found that an electrolyte membrane which is produced by irradiating a resin with UV light and graft polymerizing a radical polymerizable monomer to the resin has improved oxidation resistance and satisfactory elongation and strength, and that an electrolyte membrane suited for use in fuel cells can be produced.

Accordingly, the present invention provides methods for producing an electrolyte membrane and an electrolyte membrane-electrode assembly for use in fuel cells, as defined below.

[I] A method for producing an electrolyte membrane for fuel cells, comprising the steps of irradiating a resin with ultraviolet light, contacting the resin with a radical polymerizable monomer, and effecting graft polymerization without using a photopolymerization initiator.

[II] A method for producing an electrolyte membrane for fuel cells, comprising the steps of contacting a resin with a radical polymerizable monomer while irradiating the resin with ultraviolet light, and effecting graft polymerization without using a photopolymerization initiator.

[III] A method for producing an electrolyte membrane for fuel cells according to [I] or [II] wherein said resin comprises a fluorocarbon resin.

[IV] A method for producing an electrolyte membrane for fuel cells according to [III] wherein said fluorocarbon resin is at least one selected from the group consisting of tetrafluoroethylene-hexafluoropropylene copolymer resins, tetrafluoroethylene-perfluoroalkyl vinyl ether copolymer resins, tetrafluoroethylene-ethylene copolymer resins, and vinylidene fluoride resins.

[V] A method for producing an electrolyte membrane for fuel cells according to [IV] wherein said fluorocarbon resin is a tetrafluoroethylene-ethylene copolymer resin.

[VI] A method for producing an electrolyte membrane for fuel cells according to [I] or [II] wherein said resin comprises an aromatic hydrocarbon resin.

[VII] A method for producing an electrolyte membrane for fuel cells according to [VI] wherein said aromatic hydrocarbon resin is a polyether ether ketone.

[VIII] A method for producing an electrolyte membrane for fuel cells according to [I] to [VII] wherein said radical polymerizable monomer comprises at least one monomer selected from the group consisting of styrene, trifluorostyrene and derivatives thereof.

[IX] A method for manufacturing an electrolyte membrane-electrode assembly for fuel cells, comprising the steps of providing an electrolyte membrane for fuel cells by the method of [I] to [VIII], and joining first and second electrodes to opposing surfaces of the electrolyte membrane, respectively.

ADVANTAGEOUS EFFECTS OF THE INVENTION

The fuel cell electrolyte membrane of the invention is manufactured by UV-induced graft polymerization and has both oxidation resistance and excellent mechanical properties. Using this electrolyte membrane, a fuel cell of drastically improved performance can be fabricated.

BEST MODE FOR CARRYING OUT THE INVENTION

Now the invention is described in more detail. The method for producing an electrolyte membrane for fuel cells according to the invention involves the steps of irradiating a resin with UV light and graft polymerizing a reactive monomer to the resin.

Examples of the resin used herein include fluorocarbon resins such as tetrafluoroethylene-hexafluoropropylene copolymer resins (FEP), tetrafluoroethylene-perfluoroalkyl vinyl ether copolymer resins (PFA), ethylene-tetrafluoro-ethylene copolymer resins (ETFE), and vinylidene fluoride resins (PVDF), and aromatic hydrocarbon resins such as polyether ether ketone (PEEK), which may be used alone or in admixture of two or more. The resins may be configured into sheet, film or plate shape.

According to the invention, an ion exchange group or a radical polymerizable monomer capable of introducing an ion exchange group is graft polymerized to a surface of the resin with the aid of UV irradiation without using a photopolymerization initiator, whereby an electrolyte membrane for fuel cells is obtained. In this regard, there are a previous irradiation mode wherein a resin is previously irradiated with UV light to create radicals that can trigger grafting, and graft reaction is then performed on a monomer in contact with the resin, and a simultaneous irradiation mode wherein UV light is irradiated in the co-presence of a monomer and a resin. The inventive method may adopt either of the modes.

Although the conditions under which the resin is irradiated with UV light may be determined as appropriate, UV light with a wavelength of 100 to 600 nm, especially 200 to 400 nm, is preferably irradiated at a power or intensity of 2,000 to 4,000 W, especially 4,000 W for about 10 to 60 minutes, especially about 20 to 30 minutes.

Since higher temperatures during UV irradiation facilitate a likelihood for active sites to extinguish, the temperature during UV irradiation is preferably equal to or lower than room temperature, and more preferably 20 to 40° C.

Moreover, UV irradiation is preferably performed in an inert gas atmosphere such as helium, nitrogen or argon gas. The inert gas should preferably have an oxygen concentration of up to 100 ppm, and more preferably up to 50 ppm, although it is not necessarily needed to perform irradiation in the absence of oxygen.

In the fuel cell electrolyte membrane of the invention, the radical polymerizable (or reactive) monomer to be graft polymerized to a resin with the aid of UV irradiation is not particularly limited as long as it has an ion exchange group or is capable of introducing an ion exchange group. Preferably one or more monomers selected from reactive hydrocarbon monomers and reactive fluorinated hydrocarbon monomers are used.

The preferred reactive hydrocarbon monomers to be grafted are those reactive hydrocarbon monomers which are homo-polymerizable and which have an ion exchangeable functional group, or are free of an ion exchangeable functional group, but capable of imparting an ion exchangeable functional group through chemical reaction.

Suitable ion exchangeable functional groups used herein include phenolic hydroxyl, carboxylate, amine and sulfonic groups. Since acyloxy, ester, and acid imide groups can be quantitatively converted through hydrolysis into ion exchangeable functional groups such as phenolic hydroxyl and sulfonic groups, monomers having such groups may also be used.

Illustrative examples of reactive hydrocarbon monomers having an ion exchangeable functional group include acrylates, methacrylates, maleates, fumarates, hydroxyoxystyrene, acyloxystyrene, vinyl esters, vinylsulfonates, styrene carboxylic acid, alkylsulfonic acid styrenes, and vinylsulfonic acid. Of the foregoing esters, alkyl esters of 1 to 10 carbon atoms are preferred.

In the other embodiment wherein monomers free of an ion exchangeable functional group, but capable of imparting an ion exchangeable functional group through chemical reaction are used, first a reactive monomer free of an ion exchangeable functional group is graft polymerized, and sulfonation or the like is then performed utilizing chemical reaction, thereby imparting an ion exchangeable functional group. Illustrative examples of reactive hydrocarbon monomers free of an ion exchangeable functional group, but capable of imparting an ion exchangeable functional group through chemical reaction include styrene, α-methylstyrene, vinyltoluene and hydroxystyrene. Notably, the introduction of a sulfonic group into the reactive monomer may be conducted by reaction with a sulfonating agent such as sulfuric acid or fuming sulfuric acid.

If necessary, a crosslinkable monomer, typically a monomer having a plurality of vinyl groups such as divinylbenzene may be admixed with the reactive monomer in an amount of 0.1 to 15 mol %. The combined use of such a crosslinkable monomer enables to introduce a crosslinked structure into a graft chain.

Like the foregoing reactive hydrocarbon monomers, the preferred reactive fluorinated hydrocarbon monomers are those fluorinated hydrocarbon monomers which have an ion exchange functional group, or which are free of an ion exchangeable functional group, but capable of imparting an ion exchangeable functional group through chemical reaction. With respect to these reactive fluorinated hydrocarbon monomers, suitable functional groups which can be converted into an ion exchangeable functional group through hydrolysis include —$SO_2F$, —$SO_2NH_2$, —COOH, —CN, —COF and —COOR wherein R is $C_1$-$C_{10}$ alkyl. These functional groups are preferred because they are readily convertible into sulfone and carboxylic groups through hydrolysis.

Illustrative examples of the reactive fluorinated hydrocarbon monomers include the following.

trifluorovinylsulfonyl halides:
$CF_2$=$CFSO_2X$ wherein X is —F or —Cl
trifluorovinyl ether sulfonyl halides:
$CF_2$=CF—O—$SO_2X$ wherein X is —F or —Cl perfluoroallyl fluorosulfide:
$CF_2=CFCF_2-O-SO_2F$
perfluorovinyl ether sulfonylfluoride:
$CF_2=CF-O-CF_2CF(CF_3)O(CF_2)_2SO_2F$
trifluorostyrene:
$CF_2=CFC_6H_5$
trifluoroacrylates:
$CF_2=CFCOOR$ wherein R is $-CH_3$ or $-C(CH_3)_3$ The radical reactive monomer to be grafted to the UV-irradiated resin is preferably used in an amount of 1,000 to 100,000 parts by weight, more preferably 4,000 to 20,000 parts by weight per 100 parts by weight of the resin. Less amounts of the radical reactive monomer may lead to short contact whereas larger amounts may fail in efficient utilization of the radical reactive monomer.

In the practice of the invention, a solvent may be used during graft reaction. Those solvents in which the reactive monomer may be uniformly dissolved are preferred. Exemplary solvents which can be used herein include ketones such as acetone and methyl ethyl ketone; esters such as ethyl acetate and butyl acetate; alcohols such as methyl alcohol, ethyl alcohol, propyl alcohol, and butyl alcohol; ethers such as tetrahydrofuran and dioxane; N,N-dimethylformamide, N,N-dimethylacetamide; aromatic hydrocarbons such as benzene and toluene; aliphatic or alicyclic hydrocarbons such as n-heptane, n-hexane and cyclohexane; or mixtures thereof.

The solvent is desirably used in such an amount as to give a monomer/solvent (weight) ratio between 0.1 and 9. A monomer/solvent (weight) ratio above 9 may make it difficult to control the number of monomer units in the graft chain whereas a ratio below 0.1 may lead to too low a degree of grafting. The preferred monomer/solvent (weight) ratio is between 1 and 4.

In the practice of the invention, the reaction atmosphere under which graft polymerization is performed is preferably regulated to an oxygen concentration of 0.05 to 5% (% by volume, ditto hereinafter). It is believed that oxygen in the reaction atmosphere can react with radicals within the system to create carbonyl or peroxy radicals which function to retard further progress of the reaction. If the oxygen concentration is less than 0.05%, the radical polymerizable monomer may polymerize by itself to produce a gel which is insoluble in the solvent, some reactant is thus wasted, and gel removal is time consuming. An oxygen concentration in excess of 5% may lead to a lower degree of grafting. The desired oxygen concentration is 0.1 to 3% and more desirably 0.1 to 1%. The gas that is used herein except oxygen may be an inert gas such as nitrogen or argon.

The preferred reaction conditions for graft polymerization include a temperature of 0 to 100° C., especially 40 to 80° C. and a time of 1 to 40 hours, especially 4 to 20 hours.

As described above, a solid polymer electrolyte membrane is obtainable by graft polymerizing a radical polymerizable monomer to a UV-irradiated resin, optionally followed by sulfonation or the like.

The technique of imparting an ion exchangeable functional group by sulfonation or otherwise is as described above. Sulfonation may be performed by contact with a sulfonating agent such as chlorosulfonic acid or fuming sulfuric acid.

The fuel cell electrolyte membrane of the invention is used to construct an electrolyte membrane-electrode assembly for fuel cells by disposing the electrolyte membrane between first and second electrodes each having a catalyst carried thereon (or fuel and air electrodes) in close contact therewith. This electrolyte membrane-electrode assembly may be manufactured by the following method.

Electrodes serving as an anode (fuel electrode) and a cathode (air electrode) are joined to the fuel cell electrolyte membrane defined above. Herein, the electrode comprises a porous support and a catalyst layer. For the porous support, carbon paper, carbon cloth or the like is preferably used. Also preferably the catalyst layer comprises a nano-particle catalyst and a proton-conductive polymer electrolyte.

The nano-particle catalysts used herein include platinum group metal nano-particle catalysts and platinum alloy nano-particle catalysts. The platinum group metal nano-particle catalysts include platinum, ruthenium, palladium, rhodium, iridium, osmium and the like. The platinum alloy nano-particle catalysts include alloys of platinum with at least one metal selected from among ruthenium, palladium, rhodium, iridium, osmium, molybdenum, tin, cobalt, nickel, iron, chromium and the like. The platinum alloy should preferably contain at least 5% by weight, and more preferably at least 10% by weight of platinum.

The platinum group metal nano-particle catalysts and platinum alloy nano-particle catalysts used herein have a particle size (average particle diameter) of up to 4 nm, preferably 1 to 4 nm, and more preferably 2 to 3.5 nm. A catalyst having a particle size in excess of 4 nm has a smaller specific surface area, giving rise to a problem of lower catalytic activity. It is noted that the particle size is as observed under a transmission electron microscope (TEM).

The nano-particle catalysts used herein may be those supported on carbon, and commercially available catalysts may be used.

The nano-particle catalyst has a catalyst loading of 0.05 to 1 $mg/cm^2$, preferably 0.3 to 0.5 $mg/cm^2$ in each electrode catalyst layer. Too small a catalyst loading may fail to exert the catalytic effect whereas a catalyst loading in excess of 1 $mg/cm^2$ may provide a thicker catalyst layer to detract from the cell output.

The proton-conductive polymer electrolytes having a sulfonic group which are advantageously used herein include perfluoro electrolytes as typified by Nafion® (duPont), hydrocarbon electrolytes as typified by styrene sulfonic acid-butadiene copolymers, and inorganic/organic hybrid electrolytes as typified by sulfonic acid-containing alkoxysilane and terminally silylated oligomers.

Further, carbon nano-particles having no catalyst supported thereon may be compounded for the purpose of improving electron conductivity.

Notably, to a catalyst paste from which the catalyst layer is formed, a solvent may be added for the purpose of improving coating operation when the catalyst paste is applied to the electrode and/or electrolyte membrane. Examples of the solvent include alcohols such as methyl alcohol, ethyl alcohol, n-propyl alcohol, isopropyl alcohol, n-butyl alcohol, ethylene glycol, and glycerin; ketones such as acetone and methyl ethyl ketone; esters such as ethyl acetate and butyl acetate; ethers such as tetrahydrofuran and dioxane; aromatic hydrocarbons such as benzene and toluene; aliphatic or alicyclic hydrocarbons such as n-heptane, n-hexane and cyclohexane; and polar solvents such as water, dimethyl sulfoxide, N,N-dimethylformamide, N,N-dimethylacetamide, formamide, N-methylformamide, N-methylpyrrolidone, ethylene carbonate, and propylene carbonate. These solvents may be used alone or in admixture of two or more. Of these, polar solvents such as isopropyl alcohol, water, and N,N-dimethylformamide are desirable.

Also a fluorocarbon resin may be added to the paste in order to increase the porosity of the catalyst layer to facilitate transfer of water. Suitable fluorocarbon resins include polytetrafluoroethylene (PTFE), tetrafluoroethylene-hexafluoropropylene copolymers (FEP), tetrafluoroethylene-perfluoroalkyl vinyl ether copolymers (PFA), polychlorotrifluoroethylene (PCTFE), ethylene-tetrafluoroethylene copolymers (ETFE), polyvinylidene fluoride (PVDF), polyvinyl fluoride (PVF), trifluoroethylene-ethylene copolymers (ECTFE), which may be used alone or in combination of two or more. As the fluorocarbon resin, commercially available resins having a number average molecular weight of the order of 100,000 to 600,000 as measured by GPC versus polystyrene standards may be used.

Although the amounts of the foregoing components used vary over a wide range, the preferred amounts are 50 to 200 parts by weight of the proton-conductive polymer electrolyte, 0 to 5,000 parts by weight, more specifically 100 to 1,000 parts by weight of the solvent, and 10 to 400 parts by weight, more specifically 40 to 130 parts by weight of the fluorocarbon resin, relative to 100 parts by weight of the catalyst particles.

From the catalyst paste described above, a catalyst layer is formed in a standard way by coating the paste onto the electrolyte membrane or porous electrode substrate, and if the solvent has been added to the paste, removing the solvent.

After the catalyst layer is formed on at least one of the electrolyte membrane and the electrode substrate, the electrolyte membrane having opposite surfaces may be sandwiched between electrode substrates and hot pressed together to construct a membrane-electrode assembly. While the hot pressing temperature may be selected as appropriate depending on the electrolyte membrane used or the type and blend ratio of fluorocarbon resin and other components in the catalyst paste used, the desired temperature range is from 50 to 200° C., and more desirably 80 to 180° C. Temperatures below 50° C. may provide an insufficient joint whereas temperatures above 200° C. may cause degradation of the electrolyte membrane or the resin component in the catalyst layer. While the applied pressure level may be selected as appropriate depending on the electrolyte membrane and/or the type and blend ratio of fluorocarbon resin and other components in the catalyst paste and the type of porous electrode substrate, the desired pressure range is from 1 to 100 kgf/cm$^2$, and more desirably 10 to 100 kgf/cm$^2$. Pressures below 1 kgf/cm$^2$ may provide an insufficient joint whereas pressures above 100 kgf/cm$^2$ may reduce the porosity of the catalyst layer and electrode substrate, leading to degraded performance.

An electrode membrane-electrode assembly may be manufactured in this way.

Understandably, the electrolyte membrane of the invention may be used as a solid polymer electrolyte membrane disposed between fuel and air electrodes in a fuel cell. When a catalyst layer/fuel diffusion layer and a separator are disposed on opposing surfaces of the solid polymer electrolyte membrane, the membrane is utilized as an effective electrolyte membrane, typically for direct methanol fuel cells. Thus a fuel cell having improved cell performance is obtainable. It is noted that the structure and materials of fuel and air electrodes and the structure of the fuel cell may be well-known ones.

Example

Examples and Comparative Examples are given below for illustrating the invention, but the invention is not limited thereto. In Examples, all compounding amounts are parts by weight.

Example 1

Using a ultraviolet (UV) irradiation system (Eye Graphics Co., Ltd.), an ethylene-tetrafluoroethylene (ETFE) film (dimensions 6 cm×5 cm×25 μm thick, weight 0.13 part) was irradiated in a nitrogen atmosphere at room temperature with UV of 360 nm wavelength for 20 minutes (irradiation power 4,000 W). The film was immersed in a solution containing 16 parts of styrene and 4 parts of isopropyl alcohol which had been depleted of oxygen by nitrogen bubbling, and heated at 80° C. for 16 hours for graft polymerization. This resulted in a grafting degree of 38%. The atmosphere for grafting was a nitrogen atmosphere having an oxygen concentration of 0.01%.

The graft-polymerized film was then immersed in a 0.2 mol % chlorosulfonic acid/dichloromethane mixture, heated at 50° C. for 6 hours, then immersed in deionized water at 60° C. overnight for hydrolysis, yielding a solid polymer electrolyte membrane having sulfonic groups. The solid polymer electrolyte membrane thus obtained was measured for proton conductivity at room temperature to find a value of 0.14 S/cm. The membrane showed a weight loss of 10% after it was immersed in a 3% hydrogen peroxide aqueous solution at 80° C. for 10 hours.

Comparative Example 1

The procedure was the same as in Example 1 except that graft polymerization was performed on a ETFE film which had been irradiated with electron beam in a dose of 2 kGy. The membrane had a grafting degree of 40%, a proton conductivity of 0.14 S/cm, and a weight loss of 40% after immersion in a 3% hydrogen peroxide aqueous solution at 80° C. for 10 hours.

Example 2

A polyether ether ketone (PEEK) film (dimensions 6 cm×5 cm×50 μm thick, weight 0.19 part) was immersed in a solution containing 16 parts of styrene and 4 parts of isopropyl alcohol which had been depleted of oxygen by nitrogen bubbling, at room temperature, while it was irradiated with UV light having wavelength 360 nm and irradiation power 4,000 W for 10 hours. Graft polymerization resulted in a grafting degree of 11.3%. The atmosphere for grafting was a nitrogen atmosphere having an oxygen concentration of 0.01%.

The invention claimed is:

1. A method, comprising irradiating polyether ether ketone (PEEK) with ultraviolet light, and contacting the polyether ether ketone (PEEK) with a radical polymerizable monomer, thereby effecting graft polymerization in the absence of a photopolymerization initiator,
   wherein said irradiating is carried out in an inert atmosphere comprising at least one member selected from the group consisting of helium, nitrogen, and argon, and wherein oxygen is present in said inert atmosphere in an amount of at most 100 ppm.

2. A method, comprising contacting polyether ether ketone (PEEK) with a radical polymerizable monomer while irradiating the polyether ether ketone (PEEK) with ultraviolet light, thereby effecting graft polymerization in the absence of a photopolymerization initiator,
   wherein said irradiating is carried out in an inert atmosphere comprising at least one member selected from the group consisting of helium, nitrogen, and argon, and wherein oxygen is present in said inert atmosphere in an amount of at most 100 ppm.

3. The method according to claim 1, wherein said radical polymerizable monomer comprises at least one monomer selected from the group consisting of styrene, trifluorostyrene and derivatives thereof.

4. A method, comprising joining first and second electrodes to opposing surfaces, respectively, of the electrolyte membrane obtained by the method of claim 1.

5. The according to claim 2, wherein said radical polymerizable monomer comprises at least one monomer selected from the group consisting of styrene, trifluorostyrene and derivatives thereof.

6. A method, comprising joining first and second electrodes to opposing surfaces, respectively, of the electrolyte membrane obtained by the method of claim 2.

7. The method according to claim 1, wherein said irradiating is carried out at a temperature of at most room temperature.

8. The method according to claim 2, wherein said irradiating is carried out at a temperature of at most room temperature.

9. The method according to claim 1, wherein, during said contacting, said polyether ether ketone (PEEK) is present in an amount of 100 parts by weight and said radical polymerizable monomer is present in an amount of from 1,000 to 100,000 parts by weight per 100 parts by weight of said polyether ether ketone (PEEK).

10. The method according to claim 2, wherein, during said contacting, said polyether ether ketone (PEEK) is present in an amount of 100 parts by weight and said radical polymerizable monomer is present in an amount of from 1,000 to 100,000 parts by weight per 100 parts by weight of said polyether ether ketone (PEEK).

11. The method according to claim 1, wherein said contacting is carried out in an atmosphere comprising nitrogen or argon, wherein oxygen is present in the atmosphere in an amount of from 0.05 to 5% by volume.

12. The method according to claim 2, wherein said contacting is carried out in an atmosphere comprising nitrogen or argon, wherein oxygen is present in the atmosphere in an amount of from 0.05 to 5% by volume.

13. The method according to claim 4, wherein each of said first and second electrodes comprises a porous support and a catalyst layer, wherein
    said porous support comprises at least one member selected from the group consisting of carbon paper and carbon cloth, and
    said catalyst layer comprises at least one of
        a platinum group metal nanoparticle comprising at least one of platinum, ruthenium, palladium, rhodium, iridium, and osmium; and
        a platinum alloy nanoparticle comprising an alloy of platinum and at least one member selected from the group consisting of ruthenium, palladium, rhodium, iridium, osmium, molybdenum, tin, cobalt, nickel, iron, and chromium, wherein platinum is present in the platinum alloy nanoparticle in an amount of at least 5% by weight, relative to the total weight of the platinum alloy nanoparticle, and
    wherein each of the platinum group metal nanoparticle and the platinum alloy nanoparticle has a particle size of from 1 to 4 nm.

14. The method according to claim 6, wherein each of said first and second electrodes comprises a porous support and a catalyst layer, wherein
    said porous support comprises at least one member selected from the group consisting of carbon paper and carbon cloth, and
    said catalyst layer comprises at least one of
        a platinum group metal nanoparticle comprising at least one member selected from the group consisting of platinum, ruthenium, palladium, rhodium, iridium, and osmium; and
        a platinum alloy nanoparticle comprising an alloy of platinum and at least one member selected from the group consisting of ruthenium, palladium, rhodium, iridium, osmium, molybdenum, tin, cobalt, nickel, iron, and chromium, wherein platinum is present in the platinum alloy nanoparticle in an amount of at least 5% by weight, relative to the total weight of the platinum alloy nanoparticle, and
    wherein each of the platinum group metal nanoparticle and the platinum alloy nanoparticle has a particle size of from 1 to 4 nm.

15. The method according to claim 1, wherein said radical polymerizable monomer comprises at least one monomer selected from the group consisting of styrene, α-methylstyrene, vinyltoluene, hydroxystyrene, and trifluorostyrene.

16. The method according to claim 2, wherein said radical polymerizable monomer comprises at least one monomer selected from the group consisting of styrene, α-methylstyrene, vinyltoluene, hydroxystyrene, and trifluorostyrene.

* * * * *